United States Patent [19]

Yamamato et al.

[11] Patent Number: 4,780,348

[45] Date of Patent: Oct. 25, 1988

[54] PRINT PROTECTING MEMBER TRANSFER LAYER HAVING SURFACE LAYER WITH LOWER SOFTENING POINT THAN UNDER LAYER

[75] Inventors: Mayumi Yamamato; Eiichi Suzuki, both of Tokyo; Takashi Akiya, Yokohama; Shigeo Toganoh, Tokyo, all of Japan

[73] Assignee: Canon Kabushiki Kaisha, Tokyo, Japan

[21] Appl. No.: 936,749

[22] Filed: Dec. 2, 1986

[30] Foreign Application Priority Data

Dec. 3, 1985 [JP] Japan ............................ 50-270790

[51] Int. Cl.[4] .......................... G09F 3/00; B32B 27/14

[52] U.S. Cl. ....................................... 428/43; 428/41; 428/215; 428/488.4; 428/195; 346/105

[58] Field of Search ...................... 428/488.4, 215, 41, 428/43

[56] References Cited

U.S. PATENT DOCUMENTS

| | | | |
|---|---|---|---|
| 4,065,595 | 12/1977 | Schick et al. | 428/412 |
| 4,614,363 | 9/1986 | Breen | 428/488.4 |
| 4,657,557 | 4/1987 | Niwa et al. | 428/488.4 |

*Primary Examiner*—P. C. Ives

*Attorney, Agent, or Firm*—Fitzpatrick, Cella, Harper & Scinto

[57] ABSTRACT

A print protecting member comprising a transfer layer laminated peelably on a substrate is provided in which the transfer layer comprises at least a surface layer and an under layer. The surface layer has a lower softening point than that of the under layer.

24 Claims, 1 Drawing Sheet

PRINT PROTECTING MEMBER TRANSFER LAYER HAVING SURFACE LAYER WITH LOWER SOFTENING POINT THAN UNDER LAYER

BACKGROUND OF THE INVENTION

1. Field of the Invention

The present invention relates to a print protecting member suitable as a laminating member for a print obtained by recording images on paper or the like according to a recording process using a recording liquid, in particular, an ink jet recording liquid.

2. Description of the Related Art

Ink jet recording is a recording process for carrying out recording by ejecting droplets of a recording liquid from an orifice of a recording head and adhering them on a recording medium such as paper. The process is free from loud noise, requires no particular fixing treatment, and can perform high speed recording and full color recording.

The recording liquid used for ink jet recording is usually comprised chiefly of a recording agent such as a dye and, as a solvent, water or a mixture of water and various solvents.

Since an aqueous recording liquid is used as mentioned above in the ink jet recording process, the recording medium used in the recording is required to have good absorption and fixation of the recording liquid. In particular, in multi-color ink jet recording which uses recording liquids of two or more colors, the quantity of the recording liquid to be adhered on the recording medium becomes so large that the recording liquid are required to have particularly good absorption and fixation.

The recording medium have the above good performances is known to include those comprising a porous receiving layer for a recording liquid, provided on a substrate such as paper and having good absorption and fixation of the liquid.

However, in the recording medium comprising the porous receiving layer for a recording liquid, there are drawbacks that the recording medium lacks surface gloss, and that images look poor when observed even if they have been sharply recorded. These drawbacks have been noted as problems to be solved particularly when multi-color images are recorded according to the ink jet recording process to form color prints.

Moreover, since a water soluble dye is chiefly used as a recording agent in the prints thus formed, the recorded images can not necessarily have sufficient water resistance, solvent resistance and abrasion resistance.

For this reason, in order to impart gloss to the recorded images, it has been practiced to carry out laminating on the recorded image face after using a recording liquid. The laminating is a method in which a print protecting member comprising a transfer medium chiefly made of thermoplastic resins such as acrylic resins, polystyrene resins, polyester resins and polyethylene resins, which is supported on a substrate such as paper, cloth or a plastic film, is pressure sticked on the image-formed face of a recording medium by bringing the transfer medium side of the former into close contact with the latter, and thereafter the substrate is separated so that the transfer medium may remain on the recording medium, whereby the gloss, water resistance, solvent resistance and abrasion resistance are imparted to the image-recorded face. The thermoplastic resin used in the transfer medium of the print protecting member is required to have the performance of blocking resistance that may not cause any blocking even when a plurality of laminated prints are stacked for storage or transportation. It is also preferable for the print protecting member to have the performance such as folding endurance so that the transfer medium will not break even if a laminated print has been folded.

However, as the blocking resistance of a resin is improved, the stickiness thereof is proportionally lowered to usually increase its softening point. Accordingly, there has been another problem that a transfer medium having good blocking property gives poor adhesion to a recording medium since a commercially available laminator can not give sufficient heater temperature.

Accordingly, the present invention has been made in view of the above problems.

SUMMARY OF THE INVENTION

An object of the present invention is to provide a print protecting member employing a laminating film that can impart water resistance, solvent resistance and abrasion resistance, to a recorded image face, and also has the blocking resistance while having good adhesion and transfer performance.

According to an aspect of the present invention, there is provided a print protecting member, comprising a transfer layer peelably laminated on a substrate, said transfer layer comprising at least a surface layer and an under layer, and the surface layer having a lower softening point than that of the under layer.

According to another aspect of the present invention, there is provided a print protecting member comprising a transfer layer peelably laminated on a substrate, said transfer layer comprising at least a surface layer and an under layer, and the surface layer having a softening point not less than 10° C. lower than that of the under layer.

DETAILED DESCRIPTION OF THE PREFERRED EMBODIMENTS

The print protecting member of the present invention comprises a transfer layer peelably laminated on a substrate, wherein the transfer layer comprises at least a surface layer and an under layer, and the under layer has a higher softening point and good blocking resistance, while the surface layer has a lower softening point than the under layer having good blocking resistance, and is a layer that can improve the adhesion.

The under layer is preferably endowed with the folding endurance, thus taking into consideration the possibility that it is to be folded after transfer.

The surface layer more preferably has not only a lower softening point than the under layer, but also good adhesion or sticking property as a material.

A preferred embodiment of the print protecting member of the present invention will be described below with reference to the accompanying drawings.

Figure 1:
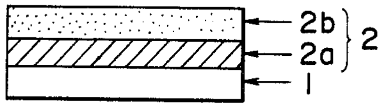
FIG. 1 is a schematical sectional view of a fundamental embodiment of the present invention.

FIG. 1 is a schematical sectional view of the print protecting member of the present invention.

Numeral 1 denotes a substrate comprising paper, a plastic film or the like, whose surface is optionally coated with a releasing agents having the releasing performance, such as silicone resins, polyester resins and thermoplastic resins. Alternatively, a Mylar ® film (a polyester film manufactured by E. I. du Pont de Nemours & Co., Inc.), a polypropylene film, etc. having itself the releasing performance may be also used. In particular, paper coated with the releasing agents having the releasing performance, such as silicone resins, polyester resins and thermoplastic resins is preferable since it can be distinguishable from the resinous transfer layer and may not curl. The substrate should have a thickness of 5 to 2,000 μm, preferably 10 to 500 μm.

Transfer layer 2 comprises at least a surface layer **2*b* and an under layer 2*a*, and is constructed in the manner that the softening point of the surface layer 2*b* is lower than that of the under layer 2*a***.

The softening point mentioned in the present invention refers to the softening point of the thermoplastic resin substantially constituting a layer.

In this invention, the respective layers are constructed in the manner that the difference between the softening point of the surface layer **2*b* and that of the under layer 2*a*** may be 10° C. or more, preferably 20° C. or more, and more preferably 25° C. or more.

The difference less than 10° C. in the softening point may sometimes result in insufficiency in either blocking resistance or adhesion property between the recording medium on which the transfer layer is applied.

In the present invention, a good result satisfying all of the blocking resistance, the transfer performance of transfer layer to coated paper, and the adhesion, can be obtained particularly when the under layer **2*a* has a softening point of higher than 100° C., the surface layer has a softening point of 60° to 100° C., preferably 70° to 100° C., and the difference between the softening points of the surface layer 2*b* and the under layer 2*a*** is within the above range.

As the resin constituting the main component of the above under layer **2*a* of the transfer layer 2**, there are used resins having good blocking resistance. More preferred are those having good blocking resistance and concurrently having good folding endurance. As the resin satisfying both of these, the present inventors have found that there can be used polyvinyl butyral resins having an average polymerization degree of 190 to 900 and a butyralation degree of 60 or more (particularly preferably an average polymerization degree of 200 to 700 and a butyralation degree of 70 or more). The reason why the average polymerization degree and the butyralation degree are defined to have the above values is that, in the butyral resins, the polymerization degree less than 150 may result in poor folding endurance and blocking resistance, and the degree more than 900 may result in low heat-melting properties to give poor transfer performance; and the butyralation degree of less than 60 may result in poor folding endurance. For this reason, in particular, the butyral resins having an average polymerization degree of 200 to 700 and a butyralation degree of 70 or more are excellent in the folding endurance, the blocking resistance and the transfer performance.

As resins usable in combination with the butyral resins constituting the under layer, reaction products of melamine resins, phenol resins, epoxy resins, isocyanates, dialdehydes, etc., and/or melamine resins, phenol resins, epoxy resins, urethane resins, urea resins, alkyd resins, cellulose resins, vinyl resins, etc. may be used to improve alcohol resistance.

If necessary, waxes, plasticizers, fluorescent brighteners, etc. may be also added. In particular, addition of plasticizers in small amount can improve the folding endurance. The under layer **2*a* may have a thickness of 1 to 50 μm, preferably 3 to 30 μm. This under layer 2*a* is supported on the substrate 1 in such a manner that it can be peeled from the substrate 1** when it is transfer-laminated on the recorded image face of a print obtained by forming images on a recording medium such as paper according to, for example, an ink jet recording process using a recording liquid containing a water soluble dye.

The surface layer **2*b* of the transfer layer 2 is in close contact with the resin constituting the under layer 2*a*. As mentioned above, it is capable of being laminated on the surface of the recorded image face with sufficient adhesion, and formed by chiefly using thermoplastic resins such as ethyl cellulose, vinyl acetate resins and derivatives thereof, polyethylene, an ethylene/vinyl acetate copolymer, acrylic resins, polystyrene and copolymers thereof, polyisobutylene, hydrocarbon resins, polypropylene, polyamide resins and polyester resins, which can impart properties such as water resistance, abrasion resistance and solvent resistance, to recorded images. The surface lamination 2*b* may further contain various additives such as waxes, plasticizers and tackifiers. The surface layer 2*b*** may have a thickness of 1 to 50 μm, preferably 3 to 30 μm.

The print protecting member of the present invention, constituted as above, can be produced by making selection from the above materials capable of forming the substrate and the tranfser layer taking into consideration the releasability of the substrate from the transfer layer, or the matching of the transfer layer to the surface of a print to be protected, and laminating the transfer layer-forming materials on the thus selected substrate by using known methods such as bar coating, blade coating, reverse roll coating and gravure roll coating.

The print protecting member of the present invention is suited for the case where it is laminated on only one side (i.e., image face) of a print. Accordingly, when it is of a type in which its transfer layer is adhered to the print by heating, the transfer layer is preferably formed in such a manner that the shrinkage of the transfer layer due to temperature change after heating is in the substantially the same degree as the shrinkage of the print or in the degree by which the laminated print may not curl because of the shrinkage of the transfer layer.

Figure 2:
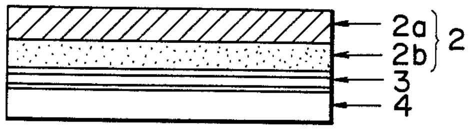
FIG. 2 is a schematical sectional view showing how laminating occurs.

FIG. 2 shows a state wherein the laminating has been performed on ink jet recording coated paper (i.e., paper comprising a coating layer 3 applied on a substrate 4), and wherein the surface layer **2*b* of the transfer layer always adheres to the coating layer 3** of the coated paper.

The print protecting member of the present invention can be endowed with a plurality of performances at the same time, because one layer of the transfer layer is present as a layer having good adhesion and another layer has the performances of blocking resistance and the like, and also these performances are effected without any limitation by the conditions for improving the adhesion. (Examples)

EXAMPLES 1 TO 4 AND COMPARATIVE EXAMPLES 1 TO 5

As components chiefly constituting the transfer layer, butyral resins and acrylic resins were used as shown in Table 1 to produce print protecting members. Performances thereof were tested for comparison.

TABLE 1

| | Resin: Under layer 2a of transfer layer / Resin: Surface layer 2b of transfer layer | Softening point | Folding endurance | Blocking resistance | Transfer performance | Adhesion |
|---|---|---|---|---|---|---|
| Example 1 | Butyral resin (Sekisui S-lec BL-S); polymerization degree: 350; butyralation degree: 70 or more | 110° C. | O | O | O | O |
| | Acrylic resin (Mitsubishi Rayon, DIANAL LR-216) | 75° C. | | | | |
| Example 2 | Butyral resin (Sekisui S-lec BL-1); polymerization degree: 270; butyralation degree: 70 or more | 107° C. | O | O | O | O |
| | Acrylic resin (Mitsubishi Rayon, DIANAL LR-216) | 75° C. | | | | |
| Example 3 | Butyral resin (Sekisui S-lec BL-1): polymerization degree: 180; butyralation degree: 70 or more | 101° C. | Δ | O | O | O |
| | Acrylic resin | 75° C. | | | | |
| Example 4 | Butyral resin (Sekisui S-lec BL-S); polymerization degree: 350; butyralation degree: 70 or more, + 4% of terpene phenol added | 110° C. | O | O | O | O |
| | Acrylic resin | 75° C. | | | | |
| Comparative Example 1 | Butyral resin (Denka 3000-1); polymerization degree: 630; butyralation degree: 75 or more | 130° C. | O | O | O | X |
| | Polyester (Toyobo, BYLON 300) | 123° C. | | | | |
| Comparative Example 2 | Acrylic resin only | 75° C. | O | X | O | O |
| Comparative Example 3 | Butyral resin only; polymerization degree: 350; butyralation degree: 70 or more | 110° C. | O | O | X | X |
| Comparative Example 4 | Butyral resin only; polymerization degree: 130; butyralation degree: 58 | 95° C. | X | Δ | O | O |
| Comparative Example 5 | Butyral resin only; polymerization degree: 1780; butyralation degree: 85 | 200° C. | O | O | X | X |

In these Examples and Comparative Examples, the folding endurance was examined by folding a sample at an angle of 180° after a print protecting member was transferred on and peeled from ink jet recording coated paper; the blocking resistance, according to "Antisticking test for packaging coated paper" in JIS Z-0219; the transfer performance, by observing whether a substrate can be smoothly peeled without difficulties such as halfway hitching and break of a coating layer, when a substrate of a print protecting member is manually peeled after it has been transferred on a coating layer of an ink jet recording coated paper; and the adhesion, by carrying out a 90° peel test between the transfer medium (or layer) and the ink jet recording coated paper of a sample on which the transfer and peeling have been performed, to observe whether or not the adhesion is so strong as to cause the break of the coated paper. Results obtained are summarized in Table 1.

It is seen from Table 1 that the print protecting member obtained in these Examples of the present invention is endowed with all the folding endurance, blocking resistance, transfer performance and adhesion.

As described above, the print protecting member of the present invention is a print protecting member that can impart water resistance, solvent resistance and abrasion resistance, to recorded images, and at the same time not only can have good adhesion and transfer performance to a recorded image face, but also can have folding endurance.

We claim:

1. A print protecting member, comprising a transfer layer peelably laminated on a substrate, said transfer layer comprising an under layer and a surface layer laminated in this order on the substrate, wherein the entire transfer layer including both the under and surface layers is peelably removable from the substrate and the surface layer has a lower softening point than the under layer.

2. The print protecting member according to claim 1, wherein the surface layer has a thickness ranging between 1 and 50 μm.

3. The print protecting member according to claim 1, wherein the surface layer has a thickness ranging between 3 and 30 μm.

4. The print protecting member according to claim 1, wherein the under layer has a thickness ranging between 1 and 50 μm.

5. The print protecting member according to claim 1, wherein the under layer has a thickness ranging between 3 and 30 μm.

6. The print protecting member according to claim 1, wherein the substrate has a thickness ranging between 5 and 2000 μm.

7. The print protecting member according to claim 1. wherein the substrate comprises paper, cloth or a plastic, coated with a releasing agent, or a plastic having releasability in itself.

8. The print protecting member according to claim 1, wherein the transfer layer comprises a thermoplastic resin.

9. Tne print protecting member according to claim 1, wherein the under layer comprises a butyral resin.

10. A print protecting member comprising a transfer layer peelably laminated on a substrate, said transfer layer comprising an under layer and a surface layer laminated in this order on the substrate, wherein the entire transfer layer including both the under and surface layers is peelably removable from the substrate and the surface layer has a softening point at least 10° C. lower than the under layer.

11. The print protecting member according to claim 10, wherein the surface layer has a softening point not less than 20° C. lower than that of the under layer claim 10, wherein the surface layer has a softening point not less than 20° C. lower than that of the under layer.

12. The print protecting member according to claim 10, wherein the surface layer has a softening point not less than 25° C. lower than that of the under layer.

13. The print protecting member according to claim 10, wherein the surface layer has a softening point ranging between 60° C. and 100° C.

14. The print protecting member according to claim 10, wherein the under layer has a softening point of 100° C. or more.

15. The print protecting member according to claim 10, wherein the surface layer has a thickness ranging between 1 and 50 $\mu$m.

16. The print protecting member according to claim 10, wherein the surface layer has a thickness ranging between 3 and 30 $\mu$m.

17. The print protecting member according to claim 10, wherein the under layer has a thickness ranging between 1 and 50 $\mu$m.

18. The print protecting member according to claim 10, wherein the under layer has a thickness ranging between 3 and 30 $\mu$m.

19. The print protecting member according to claim 10, wherein the substrate has a thickness ranging between 5 and 2000 $\mu$m.

20. The print protecting member according to claim 10, wherein the substrate comprises paper, cloth or a plastic, coated with a releasing agent, or a plastic having releasability in itself.

21. The print protecting member according to claim 10, wherein the transfer layer comprises a thermoplastic resin.

22. The print protecting member according to claim 10, wherein the under layer comprises a butyral resin.

23. The print protecting member according to claim 1, wherein the surface layer has a softening point ranging between 60° C. and 100° C.

24. The print protecting member according to claim 1, wherein the under layer has a softening point of 100° C. or more.

* * * * *

UNITED STATES PATENT AND TRADEMARK OFFICE

CERTIFICATE OF CORRECTION

PATENT NO. : 4,780,348

DATED : October 25, 1988

INVENTOR(S) : MAYUMI YAMAMOTO, ET AL.

It is certified that error appears in the above-identified patent and that said Letters Patent is hereby corrected as shown below:

AT [19] IN UNITED STATES PATENT ON THE TITLE PAGE

"Yamamato et al." should read --Yamamoto et al.--.

AT [75] IN INVENTORS

"Mayumi Yamamato;" should read --Mayumi Yamamoto;--.

AT [30] IN FOREIGN APPLICATION PRIORITY DATA

"Japan ..... 50-270790" should read
--Japan ..... 60-270790--.

COLUMN 4

Line 25, "surface lamination 2b" should read
--surface layer 2b--.

UNITED STATES PATENT AND TRADEMARK OFFICE
CERTIFICATE OF CORRECTION

PATENT NO. : 4,780,348

DATED : October 25, 1988

INVENTOR(S) : MAYUMI YAMAMOTO, ET AL.

It is certified that error appears in the above-identified patent and that said Letters Patent is hereby corrected as shown below:

COLUMN 7

Line 6, "Tne" should read --The--.
Line 19, "layer claim" should read --layer.---.
Lines 20-21 should be deleted.

Signed and Sealed this

Fourth Day of July, 1989

*Attest:*

DONALD J. QUIGG

*Attesting Officer*

*Commissioner of Patents and Trademarks*